(12) United States Patent
Kurosawa et al.

(10) Patent No.: US 6,519,057 B1
(45) Date of Patent: Feb. 11, 2003

(54) IMAGE RECORDING APPARATUS AND MODE SWITCHING METHOD IN THE APPARATUS

(75) Inventors: Yuji Kurosawa, Tokyo (JP); Naoya Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/008,509

(22) Filed: Jan. 16, 1998

Related U.S. Application Data

(63) Continuation of application No. 08/301,618, filed on Sep. 7, 1994, now abandoned.

(30) Foreign Application Priority Data

Sep. 13, 1993 (JP) .............................. 5-226872
Oct. 12, 1993 (JP) .............................. 5-278999

(51) Int. Cl.[7] .............................................. H04N 1/04
(52) U.S. Cl. ..................... 358/468; 358/404; 358/444; 358/442
(58) Field of Search ............................... 358/468, 444, 358/404, 442, 434, 437, 1.16, 1.15

(56) References Cited

U.S. PATENT DOCUMENTS

| | | | | | |
|---|---|---|---|---|---|
| 4,313,124 A | * | 1/1982 | Hara | ............................ | 347/57 |
| 4,345,262 A | * | 8/1982 | Shirato et al. | ................. | 347/10 |
| 4,459,600 A | * | 7/1984 | Sato et al. | ..................... | 347/47 |
| 4,463,359 A | * | 7/1984 | Ayata et al. | .................... | 347/56 |
| 4,558,333 A | * | 12/1985 | Sugitani et al. | ............... | 347/65 |
| 4,608,577 A | * | 8/1986 | Hori | ............................. | 347/66 |
| 4,723,129 A | * | 2/1988 | Endo et al. | .................... | 347/56 |
| 4,740,796 A | * | 4/1988 | Endo et al. | .................... | 347/56 |
| 4,992,884 A | * | 2/1991 | Sakata | ......................... | 358/401 |
| 5,163,125 A | * | 11/1992 | Okada | ......................... | 358/1.16 |
| 5,371,837 A | * | 12/1994 | Kimber et al. | ............... | 358/1.15 |
| 5,377,016 A | * | 12/1994 | Kashiwagi et al. | .......... | 358/468 |
| 5,379,124 A | * | 1/1995 | Ikegaya et al. | .............. | 358/404 |
| 5,383,030 A | * | 1/1995 | Seo | .............................. | 358/468 |
| 5,877,869 A | * | 3/1999 | Tachibana | .................... | 358/437 |

FOREIGN PATENT DOCUMENTS

| | | | |
|---|---|---|---|
| EP | 0519253 | * | 12/1992 |
| FR | 2568433 | * | 1/1996 |
| GB | 2221192 | * | 1/1990 |
| JP | 54-56847 | * | 5/1979 |
| JP | 59-123670 | * | 7/1984 |
| JP | 59-138461 | * | 8/1984 |
| JP | 60-71260 | * | 4/1985 |

OTHER PUBLICATIONS

Patent Abstract of Japan, "Printer", vol. 12, No. 490 Sep. 5, 1988 (JP–A–63–212557).*

* cited by examiner

*Primary Examiner*—Cheukfan Lee
(74) *Attorney, Agent, or Firm*—Fitzpatrick, Cella, Harper & Scinto

(57) ABSTRACT

In an image recording apparatus, either one of a facsimile mode to function as a facsimile apparatus and a printer mode to function as a printer is indicated by a mode selection switch, and when a facsimile signal is received in the printer mode, the facsimile mode is automatically set. When a signal is received from an external equipment such as a computer in the facsimile mode, the printer mode is automatically set but the switching to the printer mode is inhibited if unprinted received data is stored in an image memory. When data is not supplied from the external equipment for a predetermined time period in the printer mode, the facsimile mode is set.

44 Claims, 9 Drawing Sheets

IMAGE RECORDING APPARATUS AND MODE SWITCHING METHOD IN THE APPARATUS

This application is a continuation of Application Ser. No. 08/301,618, filed on Sep. 7, 1994 abandoned.

BACKGROUND OF THE INVENTION

1. Field of the Invention

The present invention relates to an image recording apparatus operable in a mode to receive image data transmitted from a sending station and record it and a mode to record data sent from an external information processing apparatus, and a mode switching method in such an apparatus.

2. Related Background Art

As computer equipment advances, a plurality of printers, copying machines and facsimile machines connected to various computer equipment can be installed in an office. Where such a large number of equipment is installed, the space required therefor is not negligible and the installation of higher performance equipment and the sharing of functions are desired.

For example, a facsimile apparatus has a copying function and it has been known that it may perform the function of a copying machine. In general, however, the facsimile is not used but weights in a stand-by state most of the day except in an office which receives an exceptionally large number of facsimile transmissions. On the other hand, the printer connected to the computer equipment is also not much occupied when viewed over a long period, although there is a difference in the operation times. Accordingly, a facsimile machine which has both the functions of the printer mode and of the facsimile mode is desired.

Where the facsimile machine has both functions and a user switches the mode by a switch as required, if the user fails to switch back to the facsimile mode after use in the printer mode, reception of a facsimile is disabled for a long time period.

SUMMARY OF THE INVENTION

It is an object of the present invention to provide an improved image recording apparatus and a mode switching method in such an apparatus.

It is another object of the present invention to provide an image recording apparatus which is operable in a mode to record data transmitted from a sending station and a mode to record data from an external information processing apparatus and has an excellent operability, and a mode switching method in such an apparatus.

It is still another object of the present invention to provide an image recording apparatus operable in a mode to record data transmitted from a sending station and a mode to record data from an external data processing apparatus and that prevents a reception disable state from occurring over a long time period, and a mode switching method in such an apparatus.

It is still another object of the present invention to provide an image recording apparatus operable in a mode to record data transmitted from a sending station and a mode to record data from an external data processing apparatus and that prevents loss of the received data, and a mode switching method in such an apparatus.

The above and other objects of the present invention will be apparent from the drawings and the following description.

DETAILED DESCRIPTION OF THE PREFERRED EMBODIMENTS

Figure 1:
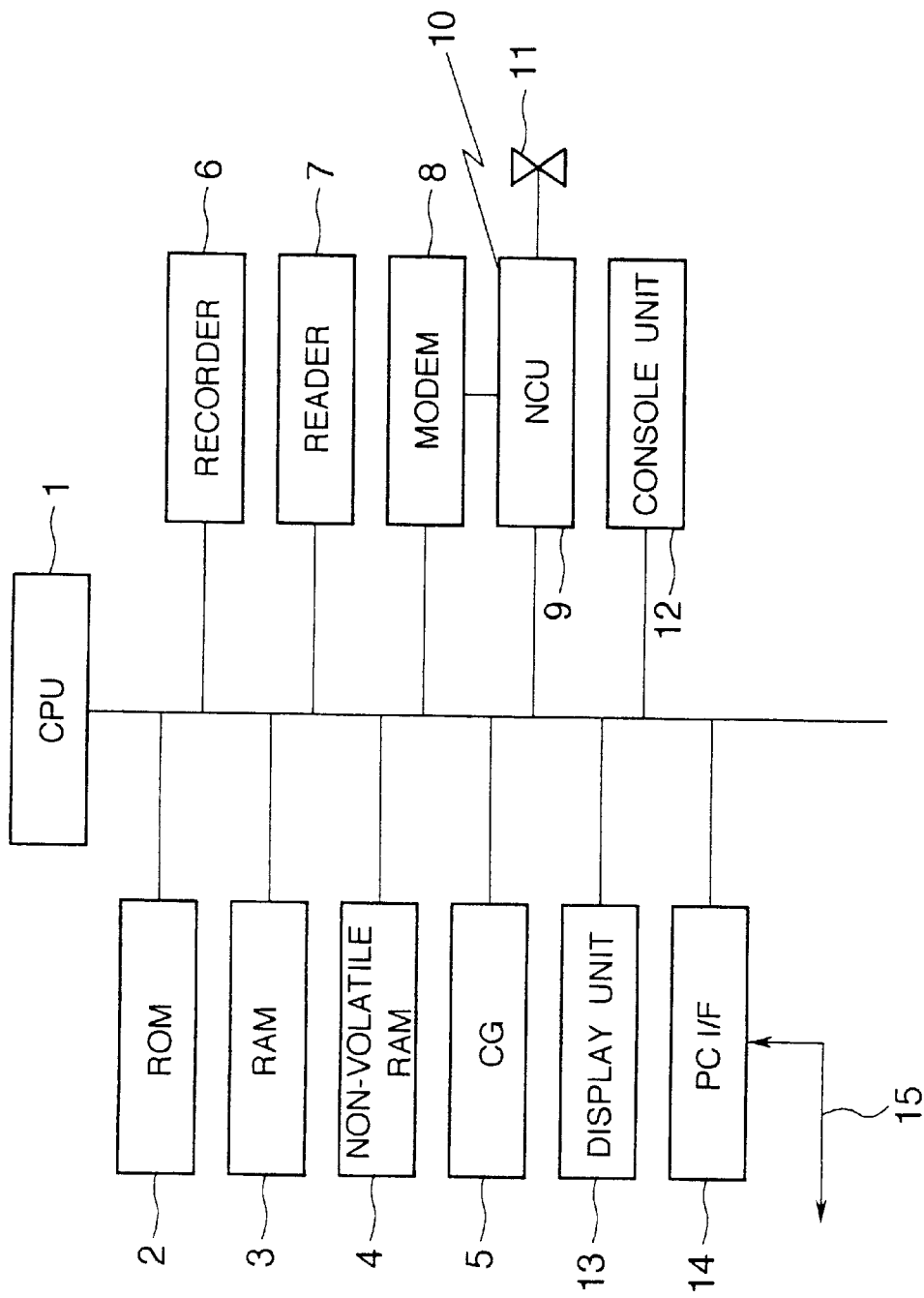
FIG. 1 shows a block diagram of a configuration of a facsimile machine of first and second embodiments of the present invention.

FIG. 1 shows a block diagram of a configuration of a facsimile machine in one embodiment of the present invention.

In FIG. 1, a CPU 1 is a central control unit having a microprocessor and controls the operation of the facsimile machine in accordance with a control program stored in a ROM 2. A RAM 3 is used as a work area to temporarily store various data during the execution of the control operation by the CPU 1 and stores binary image data read by a reader 7 such as a scanner and received image data (binary image data) recorded by a recording unit 6. The binary image data stored in the RAM 3 is encoded and then modulated by a modem 8 and outputted to a telephone line 10 through an NCU 9. The received image data is binary image data which is received from the telephone line 10 as an analog waveform signal, demodulated by the modem 8 through the NCU 9 and decoded to image data. Numeral 14 denotes an interface unit (PC I/F) with a personal computer (PC), and receives data sent from the personal computer through an interface cable 15 and transmits data to the personal computer. The data sent from the personal computer through the interface unit 14 is temporarily stored in the RAM 3 and then sent to the recording unit 6 and recorded thereby.

Numeral 4 denotes a non-volatile RAM which retains the stored data without erasing it even in an off state of a power supply of the facsimile machine of the present embodiment. Numeral 5 denotes a character generator (CG) which stores various character font data for character codes. The CPU 1 accesses the CG 5 to read the character pattern information corresponding to the character code. Numeral 6 denotes a recording unit for printing and includes a DMA controller, an ink jet print mechanism and a print control signal generation circuit and receives record data stored in the RAM 3 and prints it out as a hard copy under the control of the CPU 1.

A read unit 7 includes a DMA controller for transferring the read image data at a high speed, an image processing IC, an image sensor and a sensor control signal generation circuit, and binarizes the data read by the image sensor by the image processing IC under the control of the CPU 1 and sequentially outputs the binary data to the RAM 3. In the read unit 7, a document sheet is loaded such that it is detected by a document sensor (not shown) provided in a feed path of the document sheet. The detected document sheet signal is supplied to the CPU 1. A modem 8 includes a G3 modem and a control signal generation circuit connected to the modem, and modulates transmission data stored in the RAM 3 under the control of the CPU 1 and outputs it through the NCU 9. The modem 8 also receives an analog signal of the telephone line 10 through the NCU 9, demodulates it and stores the binarized data in the RAM 3. The NCU 9 selectively connects the telephone line to the modem 8 or a telephone set 11 under the control of the CPU 1. The NCU 9 may detect a call signal (CI). Numeral 11 denotes the telephone set which is integrated with the facsimile machine. Specifically, it comprises a hand set, a speech network, a dial, a ten-key and a one-touch key.

As will be explained later in connection with FIG. 2, a console unit 12 comprises a key 208 for starting image transmission/reception, a mode selection key 206 for designating an operation mode such as fine/standard and manual/auto-reception in the transmission mode, and a ten-key (not shown) for dialing. The CPU 1 detects the depression of those keys and controls the respective units in accordance therewith. It also has a mode selection switch 203 for switching the mode of the apparatus to a facsimile (FAX) mode or a printer mode, and the CPU 1 detects the state of the switch 203 and sets the apparatus to the corresponding mode. Numeral 13 denotes a display unit which may be a 10-digit liquid crystal display to display numerals and characters under the control of the CPU 1. It also has an indicator for indicating the FAX mode or the printer mode under the control of the CPU 1.

Figure 5:
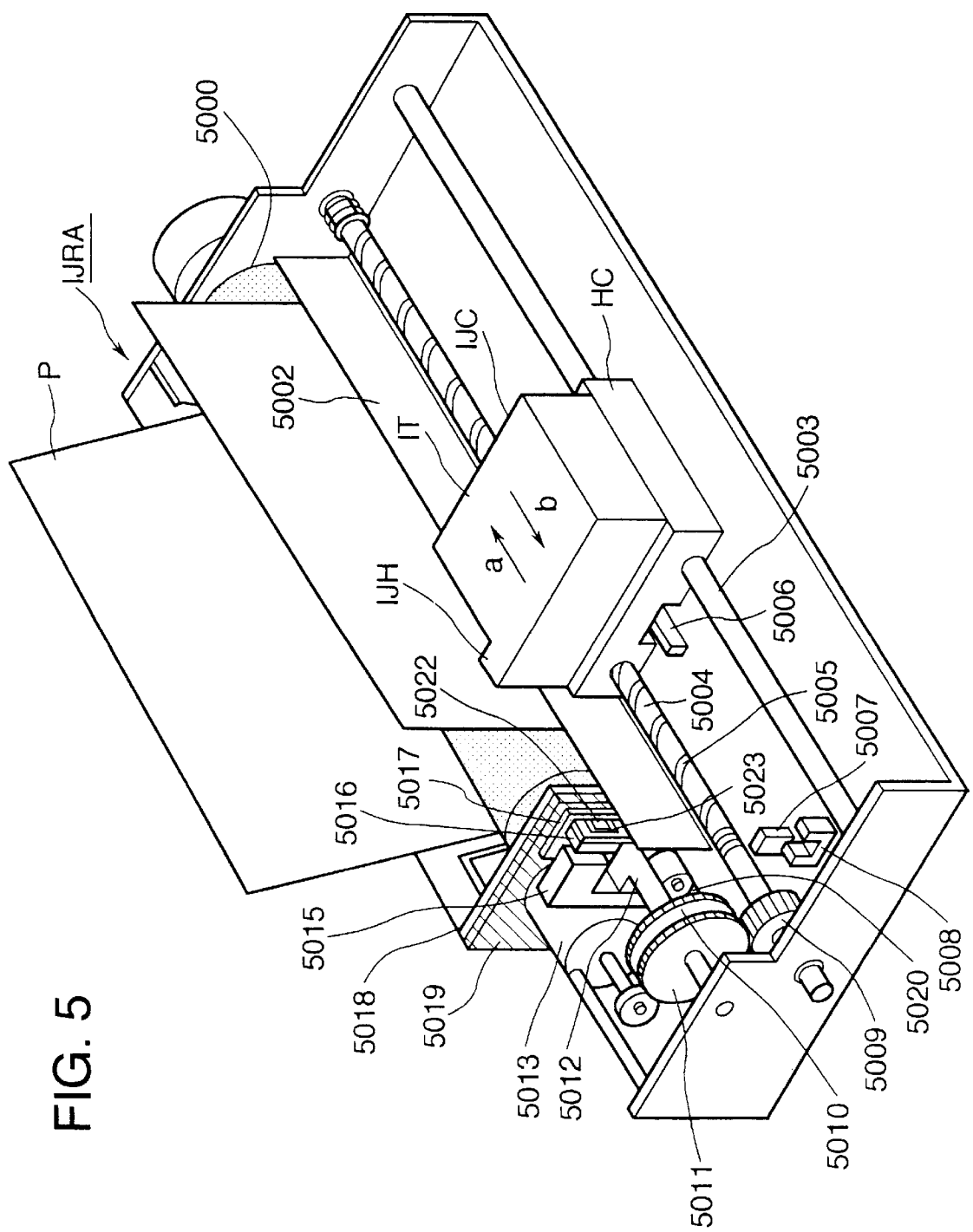
FIG. 5 shows a specific configuration of a recording unit.

FIG. 5 shows a specific configuration of the recording unit 6 in the present embodiment.

In FIG. 5, a carriage HC which engages with a spiral groove 5004 of a lead screw 5005 which is rotated by driving force transmission gears 5011 and 5009 as a drive motor 5013 is forwardly or backwardly rotated, has a pin (not shown) and is reciprocally moved in directions a and b. An ink jet cartridge IJC is mounted on the carriage HC. In the present embodiment, the ink jet cartridge IJC has a recording heads which causes a change of state in the ink by using thermal energy to discharge ink droplets and an ink tank IT integrally mounted and i is detachable from the carriage and disposable. Numeral 5002 denotes a sheet retainer plate which presses the sheet to a platen 5000 along a direction of movement of the carriage. Numerals 5007 and 5008 denote photo-couplers which are home position detection means to detect the presence of a carriage lever 5006 in the area and switch the direction of rotation of the motor 5013. Numeral 5016 denotes a member for supporting a capping member 5022 for capping a front side of the recording head and numeral 5015 denote suction means for sucking the inside of the cap to recover the suction of the recording head through the cap opening 5023. Numeral 5017 denotes a cleaning blade and numeral 5019 denotes a member for allowing the blade to move back and forth. Those are supported by a main body support plate 5018. The blade need not be the illustrated type but a known cleaning blade may be used in the present embodiment. Numeral 5012 denotes a lever for starting the suction for the suction recovery and it is moved as a cam 5020 which engages with the carriage is moved and a driving force from the driving motor is controlled by known transmission means such as a clutch.

The capping, the cleaning and the suction recovery are conducted at the corresponding positions by the action of the lead screw 5005 when the carriage reaches the area of the home position. Any of those may be applied to the present embodiment by operating them at a desired timing.

Figure 2:
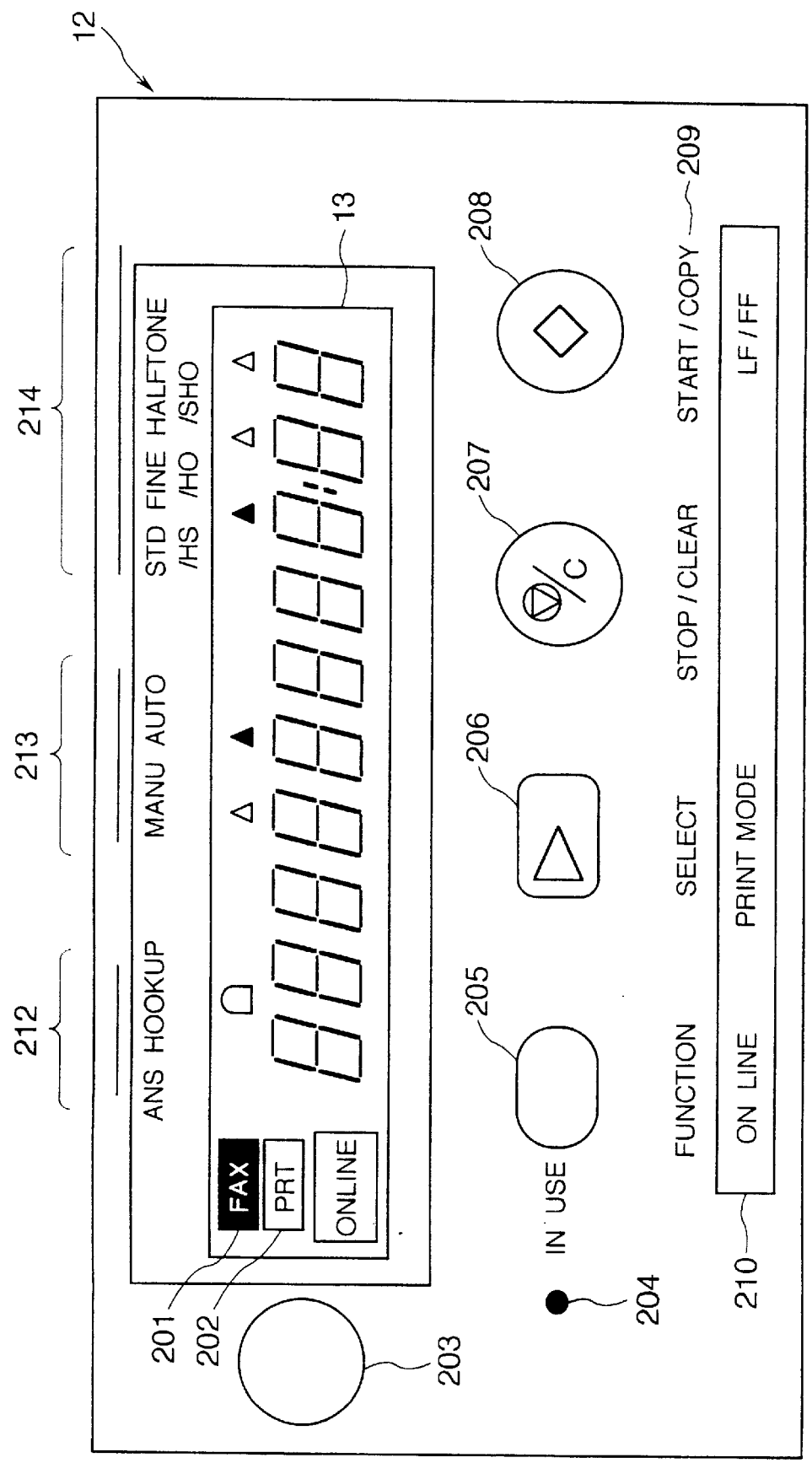
FIG. 2 shows an arrangement of a console unit and a display unit of the facsimile machine shown in FIG. 1.

FIG. 2 shows an external view of key arrangement and construction of the consol unit 12 of the facsimile machine of the present embodiment.

In FIG. 2, numeral 201 denotes an indicator which indicates the facsimile mode and is lit in the facsimile mode. Numeral 202 denotes an indicator to indicate the printer mode and is lit in the printer mode. Numeral 203 denotes a mode selection switch. Each time the key 203 is depressed, the facsimile mode and the printer mode are alternately set. Numeral 204 denotes an LED which is lit when the facsimile machine is in operation. Numeral 205 denotes a function key which is used in the facsimile mode to set functions of simultaneous multiple communication, direct communication and personal communication. The function set thereby is displayed on the display unit 13. In the printer mode, the function key 205 is used as a key to indicate the switching of on-line and off-line. Numeral 206 denotes a selection key which is used in the-facsimile mode to select the transmission mode such as a fine mode or a standard mode. In the printer mode, it is used to designate high grade printing, normal printing or high speed printing.

Numeral 207 denotes a stop/clear key which is used to stop the transmission or release an error. Numeral 208 denotes a start/copy key used to indicate the start of transmission or indicate the start of copying in the facsimile mode. In the printer mode, it functions as a sheet feed key (LF) or a fast feed key (FF). As function display for those keys, a function display 209 for the facsimile mode and a function display 210 in the printer mode are provided.

In FIG. 2, numerals 212 to 214 denote function displays which are selected by continuously depressing the key 206 in the stand-by mode of the facsimile machine. The display 212 displays a response mode and the display 213 displays manual reception (MANU) or auto-reception (AUTO). The display 214 displays the currently set transmission mode of the facsimile machine. "STD" indicates the standard mode, "FINE" indicates the fine mode and "HALFTONE" indicates the half-tone mode. At the bottom of the transmission mode display in the facsimile mode, the print mode in the printer mode is displayed.

Figure 3:
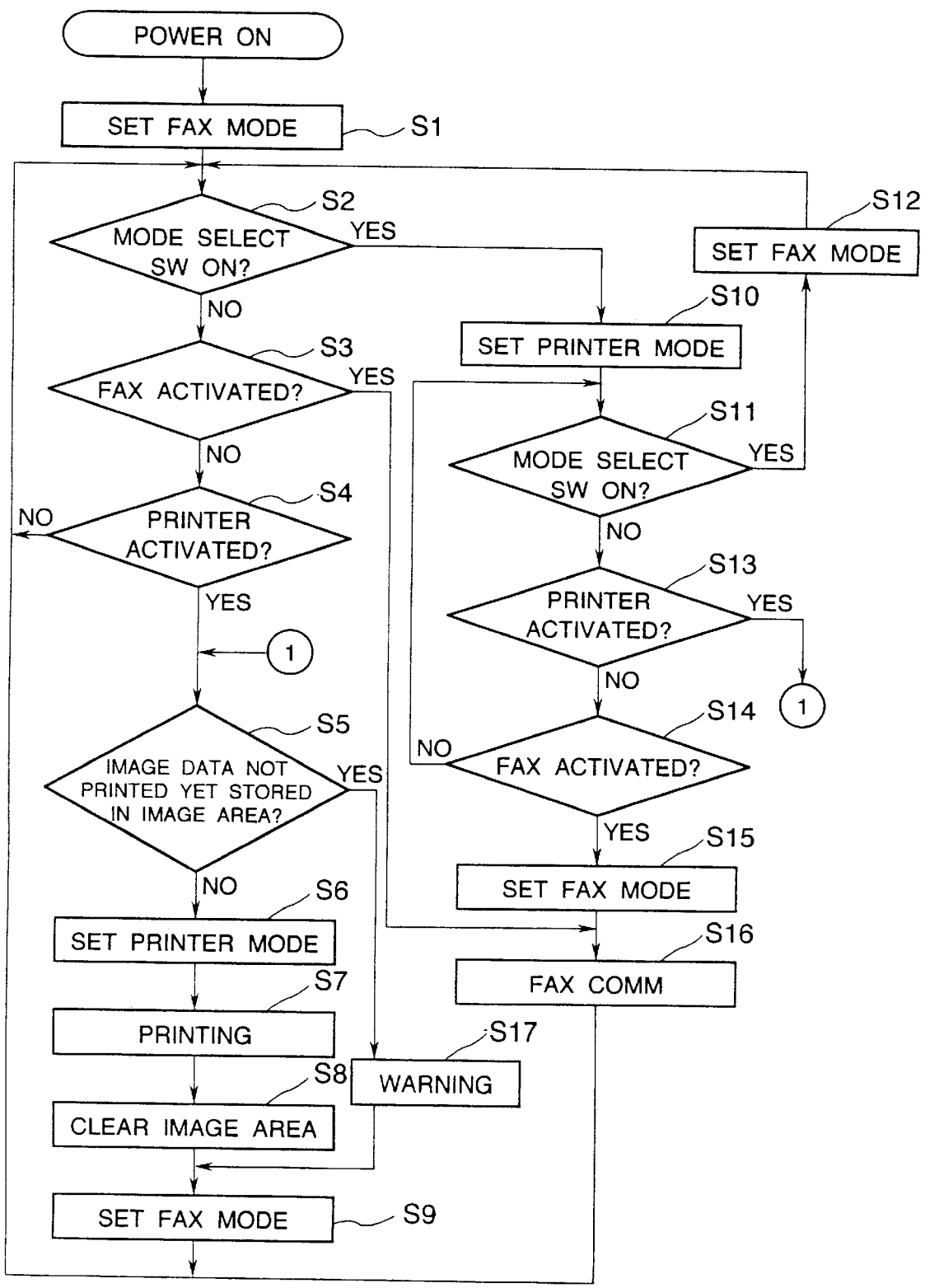
FIG. 3 shows a flow chart illustrating an operation of the facsimile machine of the first embodiment.

Referring to a flow chart of FIG. 3, a process in the facsimile machine of the present embodiment is explained. A control program for executing the process is stored in the ROM 2.

When a power of the facsimile machine is turned on, the process proceeds to a step S1 to start the operation of the CPU 1. In the step S1, the FAX (facsimile) mode is set. To set the facsimile mode, a flag indicating the FAX mode is set in a predetermined area of the RAM 3 by a command from the CPU 1 and the FAX indicator 201 of the display unit 13 is lit. The keys 205 to 208 of the console unit 12 are set for facsimile and the content displayed in the display area 209 is enabled. Then, the process proceeds to a step S2 to monitor the state of the mode selection switch 203 of the console unit 12. When the switch 203 is depressed, the process proceeds to a step S10 to set the printer mode. To set the printer mode, the FAX indicator 201 of the display unit 13 is extinguished and the printer indicator 202 is lit by a command from the CPU 1. The facsimile/printer shared keys 205 to 208 of the console unit 12 are set for the printer and the printer mode display in the display area is enabled. Thus, the flag of the RAM 3 is reset and the mode is changed from the facsimile mode to the printer mode.

When the switch 203 is not depressed, the process proceeds to a step S3 to monitor the facsimile start signals such as the CI signal, the document sheet detection signal, the hook-up signal and the depression signal of the start key 208. When the start signal is detected, the process proceeds to a step S16 to execute the facsimile operation. Then, the process returns to the step S2.

When the facsimile is not started in the step S3, the process proceeds to a step S4 to monitor whether the start signal of the printer is applied through the PS interface unit 14 or not. The printer start signal corresponds to a Centronics I/F initial signal or an RS232C start bit. When the start signal is not detected, the process returns to the step S2.

When the printer start signal is received in the step S4, the process proceeds to a step S5 to determine whether unprinted image data received and decoded by the facsimile is stored in a storage area of the image data of the RAM 3 or not. If the unprinted image data is stored in the RAM 3, the process proceeds to a step S17 to display an alarm on the display unit 13 and in a step S9, the facsimile mode is set as it is in the step S1. Then, the process returns to the step S2.

When the image data received by the facsimile is not stored in the image memory area of the RAM 3, the process proceeds to a step S6 to set the printer mode as it is in the step S10. Then, the process proceeds to a step S7 to receive the print data through the interface unit 14 and execute the normal print operation to print out the print data. When the print operation is completed, all printed print data in the RAM 3 is erased in a step S8, and in a step S9, the facsimile mode is set again as it is in the step S1. Then, the process returns to the step S2.

When the mode is switched to the printer mode in the step S2, the printer mode is set in the step S10 and the process proceeds to a step S11 to monitor whether the mode selection switch 203 is depressed or not. When the switch 203 is depressed, the process proceeds to a step S12 to set the facsimile mode as it is in the step S1, and the process returns to the step S2.

When the mode selection switch 203 is not depressed in the step S11, the process proceeds to a step S13 to monitor the printer start signal as it is in the step S4. When the start signal is applied, the process proceeds to the step S5 to execute the same process as that described above.

If the start signal is not applied in the step S13, the process proceeds to a step S14 to determine if the facsimile start signal such as the CI signal, the document sheet detection signal, the hook-up signal or the depressing signal of the start key 208 is applied to start the operation of the facsimile as it is in the step S3. If it is, the process proceeds to a step S15 to set the facsimile mode again as it is in the step S1, the facsimile operation is executed in a step S16 and the process returns to the step S2.

As described above, when the received image data is stored in the memory even if the printer mode is started or the mode is switched to the printer mode, the mode is not shifted to the printer mode and the alarm is issued so that the loss of the unprinted received image data in the image memory is prevented.

[Second Embodiment]

Figure 4:
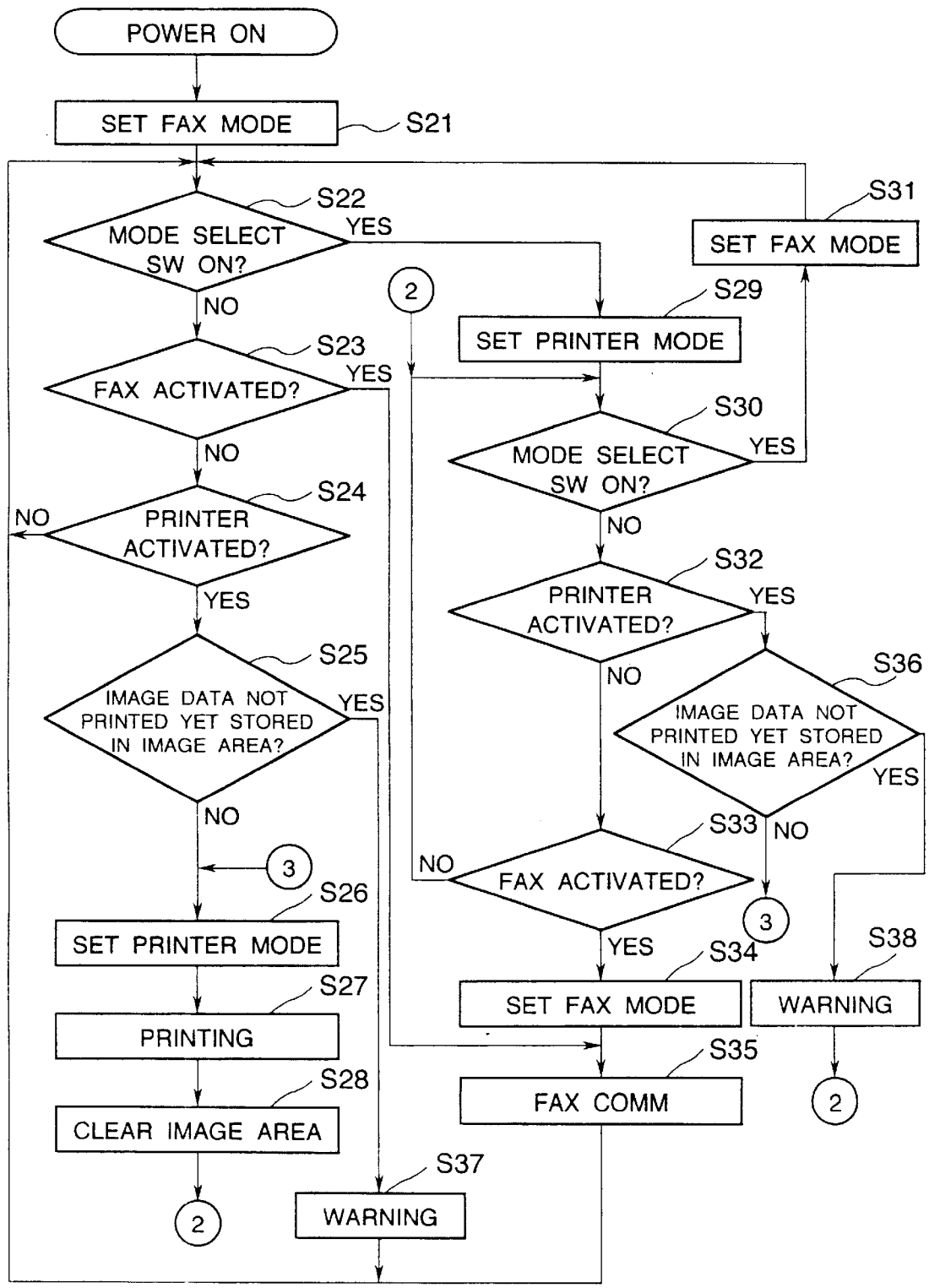
FIG. 4 shows a flow chart illustrating an operation of the facsimile machine of the second embodiment.

Referring to FIG. 4, an operation of the facsimile of another embodiment of the present invention is described in detail. The configuration of the facsimile of the present embodiment is identical to that of FIG. 1 and the explanation thereof is omitted.

FIG. 4 shows a flow chart for illustrating the operation of the facsimile machine of the present embodiment. The control program for executing the process is stored in the ROM 2.

In the facsimile machine of the present embodiment, the facsimile mode setting step in the step S9 of FIG. 3 is omitted. Thus, after the printer mode is executed, the mode does not automatically reset to the facsimile mode. Namely, the process of the steps S21 to S28 of FIG. 4 corresponds to the process of the steps S1 to S8 of FIG. 3, and in the flow chart of FIG. 4, the print operation is completed and the content of the image memory is cleared in the step S28 and the process proceeds to the step S30 to determine if the mode selection switch 203 is turned or not.

In a step S32, the process proceeds to a step S36 if the printer is started as it is in the step S24 (step S4) to determine if the received unprinted facsimile image data is stored in the RAM 3 or not, and if it is stored, the process proceeds to a step S38 to display an alarm message to indicate the unprinted received image on the display 13. The process proceeds to a step S30 to determine if the mode selection switch 203 is turned on or not. When the mode selection switch is depressed by an operator, the facsimile mode is set in the step S31 and the unprinted received image is printed out. If the unprinted received image is not stored in the step S36, the process proceeds to the step S26 to set the printer mode, and in the step S27, the input received image is printed out through the interface unit 14.

In the present embodiment, the loss of the unprinted received image data is prevented as it is in the first embodiment.

In the first and second embodiments, the apparatus may be used as both a facsimile machine and a printer and the functions are automatically switched in accordance with the reception state without requiring to the user to switch the function of the facsimile machine.

Further, since the mode is automatically switched to the facsimile mode after use in the printer mode, any facsimile signal which may be received at an unknown time can be surely received.

By inhibiting the switching to the printer mode while unprinted image data is stored in the memory, the image data received by the facsimile and not yet printed can be surely printed.

[Third Embodiment]

In the above embodiments, the setting of the printer mode or the facsimile mode is effected by the start of the respective mode and when the operation in the printer mode is completed, the mode is switched from the printer mode to the facsimile mode. Alternatively, if data is not received for a predetermined time period after the setting of the printer mode, the mode may be automatically switched to the facsimile mode.

This embodiment is explained below.

Figure 6:
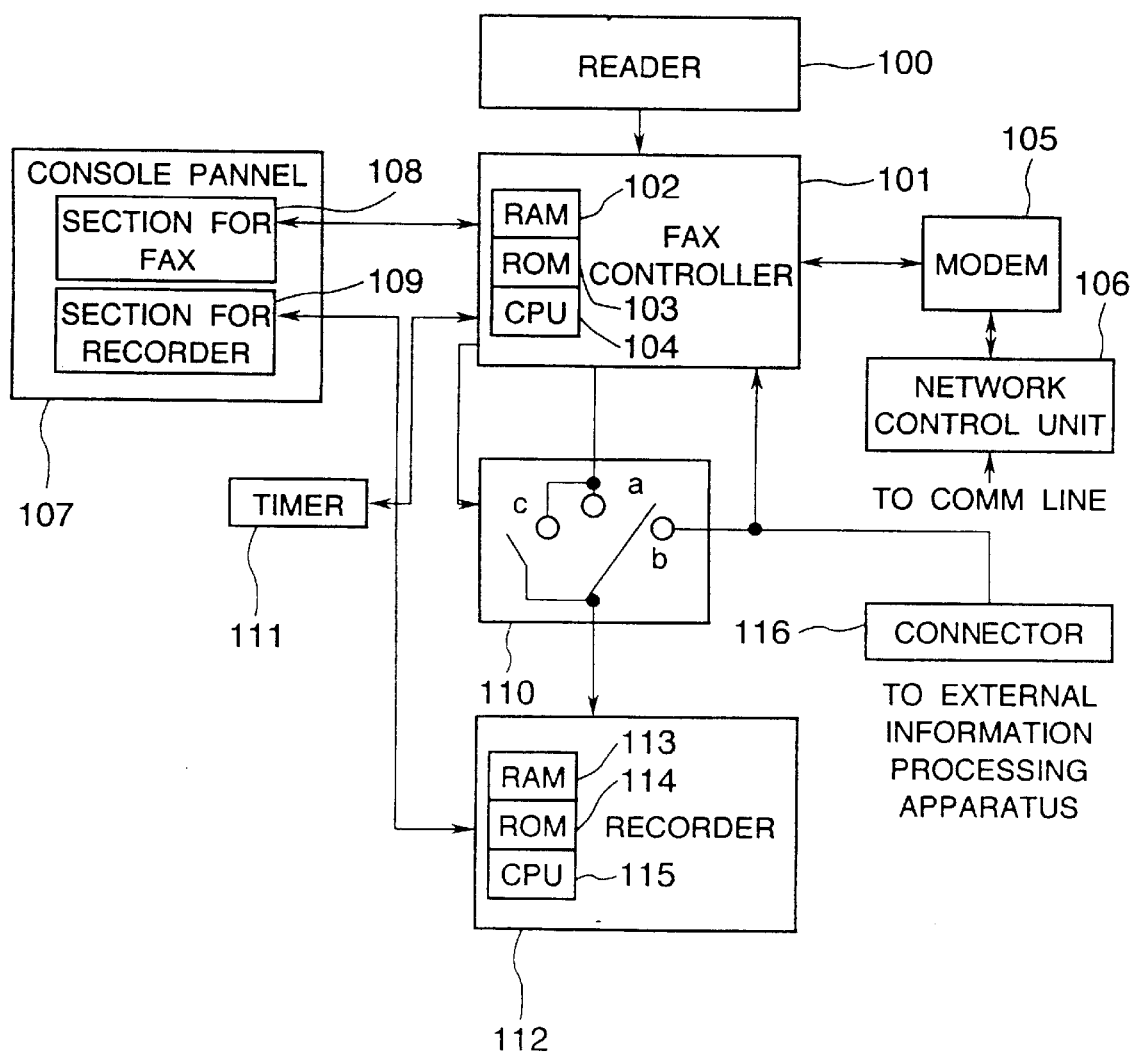
FIG. 6 shows a block diagram of a configuration of a facsimile machine of a third embodiment.

FIG. 6 shows a block diagram of a configuration of the facsimile machine of the present embodiment.

A facsimile control unit 101 comprises a microprocessor which includes a CPU (central processing unit) 104, a ROM 103 and a RAM 102 and controls the image input/output and the communication process. A ROM 114 stores a control program to be described later, and a RAM 113 is used as a work area for the CPU 104 and stores the image data.

The image input/output is effected by a read unit 100 and a record unit 112. Namely, the document sheet is read by the read unit 100 which comprises a CCD (charge coupled device) sensor and a document sheet feed unit. The received image data and the image data read by the read unit 100 in the copy mode are printed out on sheets by the record unit 112 comprising an ink jet printer. The record unit 112 is of the same configuration as that of FIG. 5 and the explanation thereof is omitted.

The connection to a communication line such as a telephone line and the data input/output are effected by the modem 105 and the NCU (network control unit) 106. A telephone set for speech and manual control is connected to the NCU 106.

The record unit 112 comprises an ink jet head, record sheet feed means and control means. The control means comprises the CPU 115, a control program for the CPU 115, a ROM 114 for storing characters and a RAM 113 used as a work area for the CPU 115, a command buffer and a print buffer.

The switch 110 is switched by the control of the facsimile control unit 101. When it is switched to position a, the facsimile received data is sent to the print unit 112 and printed out. When it is switched to position b, the print data from the external information processing apparatus connected to the connector 116 is sent to the record unit 112 and printed out.

When the switch 110 is switched to position b, it is also connected to the position c. Thus, a command from the connector 116 is applied to the switch 110 and also applied to he facsimile control unit 101 so that the facsimile control unit 101 detects that the command is sent to the record unit 112 when the switch 110 is switched to position b.

Figure 7A:
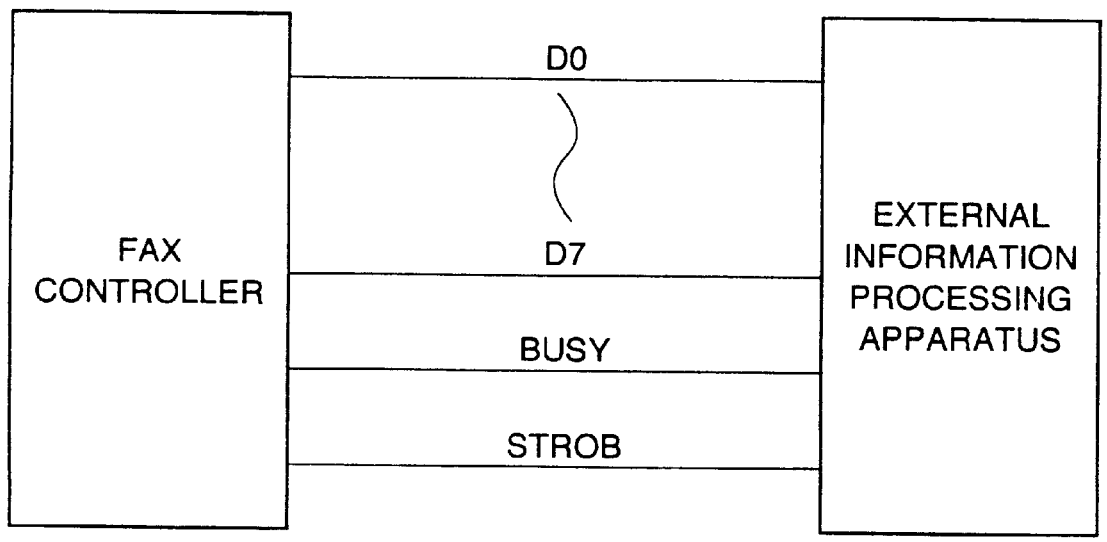
FIGS. 7A and 7B illustrate hand shaking of a facsimile control unit and an external information processing apparatus in the third embodiment.
Figure 7B:
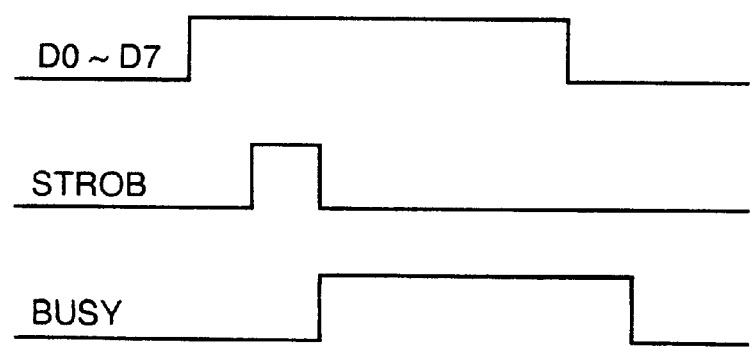

Specifically, as shown in FIGS. 7A and 7B, the facsimile control unit 101 monitors a STROB signal to detect the presence or absence of the command from the external information processing apparatus.

A timer 111 is controlled by the CPU 104 and times a predetermined set time, and when the predetermined time elapses, the timer 111 the CPU 104.

The console panel 107 is provided with the FAX console unit 108 and the recorder console unit 109. The FAX console unit 108 comprises a ten-key for entering a telephone number, various function keys, an operation mode key for switching the operation mode to the facsimile mode or the printer mode, and a display used to display the telephone number and a time. The recorder console unit 109 is provided with a display for displaying a current operation mode.

Figure 8:
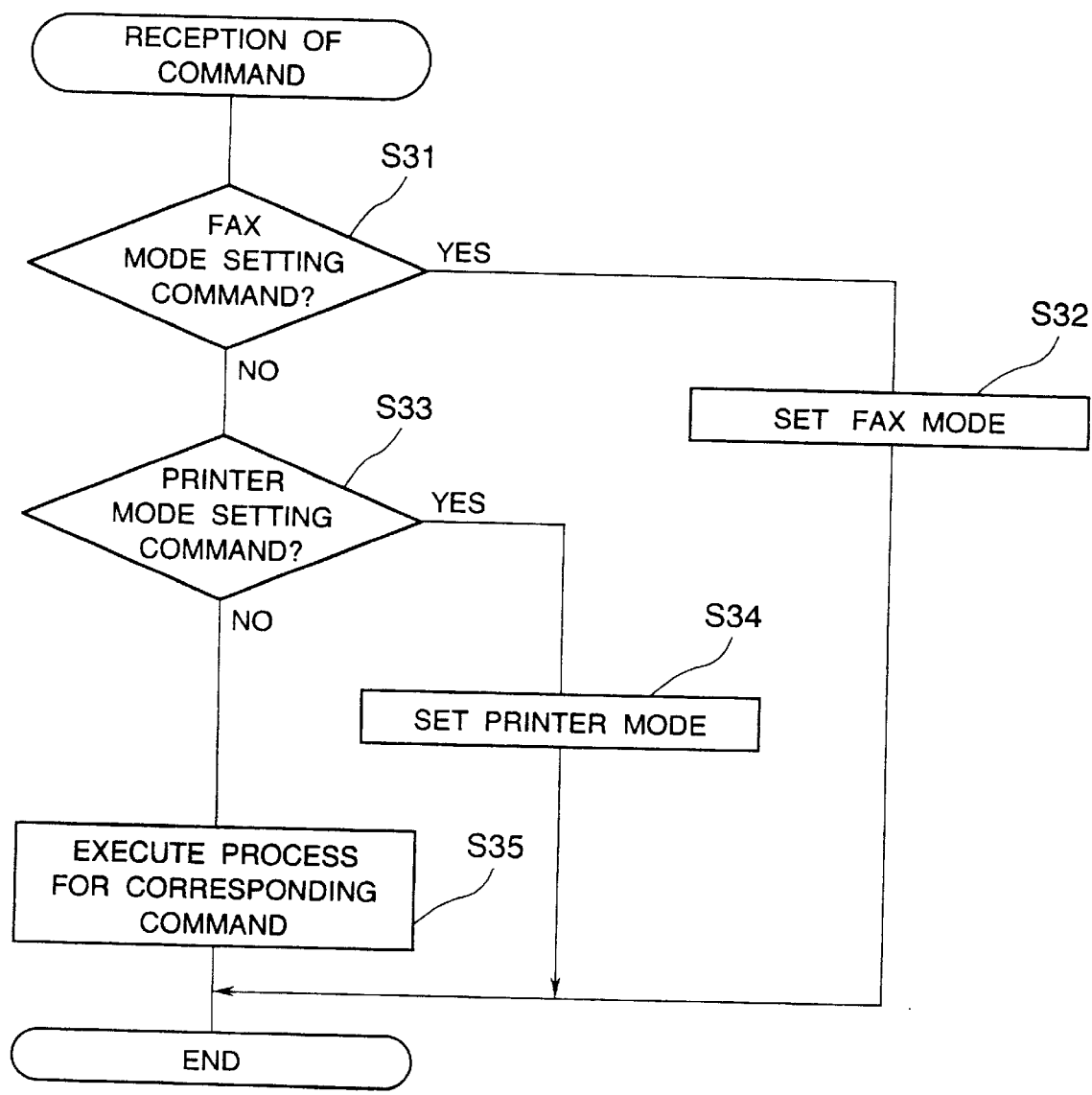
FIG. 8 shows a flow chart illustrating an operation of a recording unit of the third embodiment.
Figure 9:
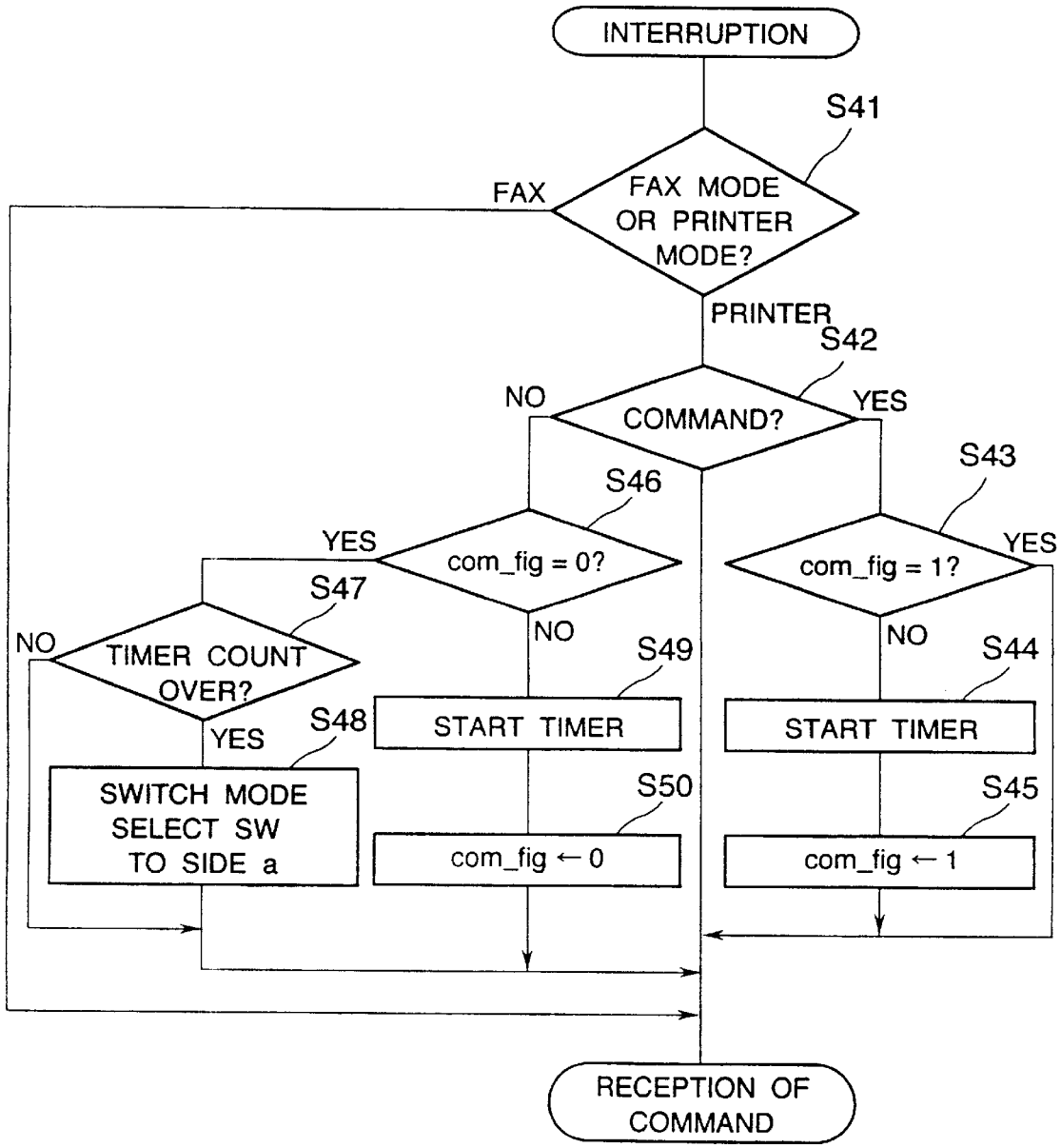
FIG. 9 shows a flow chart of an interrupt routine for switching an operation mode of the recording unit in the third embodiment.

Referring to flow charts of FIGS. 8 and 9, the operations of the facsimile control unit 101 and the record unit 112 are explained.

The record unit 112 has two operation modes. One is a mode to record the facsimile received image (facsimile mode) and the other is a mode to record data from the external information processing mode (printer mode).

FIG. 8 shows a flow chart of the operation of the record unit 112.

When a command is sent via the switch 110, the control of the record unit 112 proceeds to step S31. If the sent command is a switch command to the facsimile mode in step S31, the process proceeds to step S32.

In step S32, the operation mode of the record unit 112 is set to the facsimile mode and the reception of the command is completed. If the command is not the switch command to the facsimile mode in step S31, the process proceeds to step S33.

In step S33, if the received command is the switch command to the printer mode, the process proceeds to step S34 to set the printer mode. If the command is not the switch command to the printer mode in step S33, the process proceeds to step S35 and the other command is processed.

In the operation of the record unit 112, the switching procedure of the operation mode of the record unit 112 by the facsimile control unit 101 is explained.

As described above, the facsimile control unit 101 monitors if the command from the connector 116 is applied or not. The presence or absence of the command is detected by the interruption at an interval which allows sampling of the command by the facsimile control unit 101. The operation mode of the record unit 112 is switched as required. FIG. 9 shows a flow chart which shows the interrupt routine.

Specifically, the operation mode of the record unit 112 is detected in step S41, and if it is the printer mode, the process proceeds to a step S42, and if it is the facsimile modes the process goes out of the interrupt routine.

In step S42, the presence or absence of the command from the connector 116 is checked. If the command is detected, the process proceeds to S43 to check if com_flg is set to "1" or not, where the com_flg is a flag to indicate whether the command was detected in the previous interruption or not. The com_flg is initially set to "0" when the user manually switches the mode selection switch of the record unit on the console panel 107 to the printer mode from the facsimile mode.

If the com_flg is set to "1" in step S43, it means that the command input continues and the interruption is terminated. If the com_flg is not "1" in step S43, the timer 111 is reset in step S44 and the com_flg is set to "1" in step S45.

If the command is not detected in step S42, the process proceeds to step S46. In step S46, if the com_flg is "0", the process proceeds to step S47 to determine if the time timed by the timer 111 elapsed for a predetermined time (time out) or not. If it is not timed out, the process goes out of the interruption routine, and if it is timed out, the operation mode selection switch 110 of the record unit 112 is switched to the position a.

If the com_flg is not "0" in step S46, the process proceeds to step S49 to start the timer 111. The com_flg is set to "0" in S50.

By the above process, the record unit operation mode is automatically switched from the printer mode to the facsimile mode.

As described above, if the command from the external information processing apparatus is not applied for the predetermined time period, the record unit is automatically switched for facsimile received image recording so that user intervention is not required and the record unit operation mode is not left in the printer mode. Thus, the continued disable state of the facsimile reception is prevented.

When the user uses the facsimile machine as the printer for the external information processing apparatus, the user is not so far from the facsimile machine that the user cannot operate the facsimile machine, and the record unit operation mode may be switched as the user requests.

The present invention may be applied to a system comprising a plurality of equipment or a system comprising a single equipment. The present invention is also applicable to a system or apparatus with a program which implements the present invention.

In the embodiments, the ink jet recording head which forms the flying droplets by utilizing the thermal energy to record the data has been explained. The typical construction and the operational principles thereof are preferably the ones disclosed in U.S. Pat. Nos. 4,723,129 and 4,740,796. The principle and the structure are applicable to a so-called on-demand type recording system and a continuous type recording system. Particularly, however, it is suitable for the on-demand type because the principle is such that at least one driving signal is applied to an electro-thermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the generation, development and contraction of the bubbles, the liquid (ink) is ejected through an discharge port to produce at least one droplet. The driving signal is preferably in the form of pulse because the development and the contraction of the bubbles can be effected instantaneously, and therefore the liquid (ink) is ejected with fast response.

The pulse driving signal is preferably such as those disclosed in U.S. Pat. Nos. 4,463,359 and 4,345,262. In addition, the temperature rise rate of the heating surface is preferably such as those disclosed in U.S. Pat. No. 4,313,124.

The structure of the recording head may be those shown in U.S. Pat. Nos. 4,558,333 and 4,459,600 in which the heating portion is disposed at a bent portion, as well as the structure of the combination of the ejection outlet, liquid passage and the electro-thermal transducer disclosed in the above-mentioned patents.

In addition, the present invention is applicable to the structure disclosed in Japanese Laid-Open Patent Application No. 59-123670 in which a common slit is used as the discharge port for a plurality of electro-thermal transducers, and the structure disclosed in Japanese Laid-Open Patent Application No. 59-138461 in which an opening for absorbing a pressure wave of thermal energy is formed corresponding to the discharge port.

The present invention is effectively applicable to a so-called full-line type recording head having a length corresponding to the maximum recording width. Such a recording head may comprises a single recording head and plural recording head combined to cover the maximum width.

In addition, the present invention is applicable to a serial type recording head in which the recording head is fixed on a main assembly, to a replaceable chip type recording head which is connected electrically with the apparatus and can be supplied with the ink when it is mounted in the main assembly, or to a cartridge type recording head having an integral ink container.

The provision of the recovery means and/or the auxiliary means for the preliminary operation are preferable because they further stabilize the effects of the present invention. As for such means, there are capping means for the recording head, cleaning means therefor, pressing or sucking means, preliminary heating means which may be an electro-thermal transducer, an additional heating element or a combination thereof. Also, means for effecting preliminary discharge (not for the recording) may stabilize the recording operation.

Furthermore, in the foregoing embodiments, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable discharge in a conventional recording apparatus of this type, the ink may be such that it is liquid within the temperature range when the recording signal is applied.

In addition, the temperature rise due to the thermal energy is positively prevented by consuming it for the sate change of the ink from the solid state to the liquid state. Other ink is solidified when it is left, to prevent the evaporation of the ink. In any case, the application of the recording signal producing thermal energy, the ink is liquefied, and the liquefied ink may be discharged. Other ink may start to be solidified at the time when it reaches the recording sheet. The present invention is also applicable to the ink which is liquefied by the application of the thermal energy. Such ink may be retained in liquid state or solid state in holes or recesses formed in a porous sheet as disclosed in Japanese Laid-Open Patent Application No. 54-56847 and Japanese Laid-Open Patent Application No. 60-71260. The sheet is faced to the electro-thermal transducers. The most effective one of the inks described above is the film boiling system.

The recording apparatus may be used as an output terminal of an information processing apparatus such as a word processor or a computer in a built-in type or a standalone type as well as a copying machine combined with an image reader or a facsimile machine having information sending and receiving functions.

The present invention is applicable to not only the ink jet system which uses the thermal energy but also to an ink jet system using a piezo-electric element.

What is claimed is:

1. An image recording apparatus operable in a facsimile mode to receive data transmitted from a sending station via a line and a printer mode to record data sent from an external host computer apparatus, comprising:

setting means for setting one of said facsimile mode and said printer mode;

storage means for storing the transmitted data from the sending station in said facsimile mode and storing the data from the external host computer apparatus in said printer mode;

record means for recording an image on a recording medium in accordance with the data stored in said storage means; and control means for controlling the setting of said printer mode by said setting means in accordance with whether or not unrecorded data transmitted from the sending station is stored in said storage means, such that said control means inhibits the setting of said printer mode when there is unrecorded data transmitted from the sending station stored in said storage means and permits the setting of said printer mode when there is no unrecorded data that was transmitted from the sending station stored in said storage means.

2. An image recording apparatus according to claim 1, further comprising switching means for automatically switching to said facsimile mode after the completion of the recording in said printer mode.

3. An image recording apparatus according to claim 1, wherein said setting means includes manually operable switching means and one of said facsimile mode and said printer mode is set by the switching of said switching means.

4. An image recording apparatus according to claim 1, wherein said setting means monitors the input of a first start signal for starting the operation in said facsimile mode, and sets said facsimile mode when said first start signal is applied.

5. An image recording apparatus according to claim 1, wherein said setting means monitors the input of a second start signal for starting the operation in said printer mode, and sets said printer mode when said second start signal is applied.

6. An image recording apparatus according to claim 1, further comprising initialization means for initializing said facsimile mode when a power is turned on.

7. An image recording apparatus according to any one of claims 1 and 2 to 6, wherein said record means includes a recording head for discharging ink droplets in accordance with data and drive means for driving a recording medium relative to said recording head.

8. An image recording apparatus according to claim 7, wherein said recording head discharges the ink droplets by causing change of state of ink by using thermal energy.

9. In an image recording apparatus operable in a facsimile mode to receive data transmitted from a sending station via a line and a printer mode to record data sent from an external host computer apparatus, a mode switching method comprising:

a first step of inputting a switching request from the facsimile mode to the printer mode;

a second step of determining if unrecorded data transmitted from the sending station is stored in storage means when the switching request is inputted in said first step, the storage means storing the data transmitted from the sending station in the facsimile mode and storing the data from the external host computer apparatus in the printer mode; and a third step of controlling the switching to the printer mode in accordance with the decision in said second step, such that said third step inhibits the switching to the printer mode when said second step determines that there is unrecorded data transmitted from the sending station stored in the storage means and permits the switching to the printer mode when there is no unrecorded data that was transmitted from the sending station stored in the storage means.

10. A mode switching method according to claim 9, wherein said first step inputs the switching request from the facsimile mode to the printer mode by manually operable switching means.

11. A mode switching method according to claim 9, wherein said first step inputs the switching request from the facsimile mode to the printer mode by a start signal for starting an operation in the printer mode.

12. A mode switching method according to claim 9, further comprising a step, prior to said first step, of setting the facsimile mode upon power-on.

13. A mode switching method according to claim 9, further comprising a step of switching the mode to the facsimile mode upon completion of the recording operation in the printer mode.

14. A mode switching method according to any one of claims 9 and 10 to 13, wherein the image recording apparatus records an image on a recording medium by using a recording head for discharging ink droplets in accordance with data.

15. A mode switching method according to claim 14, wherein the recording head discharges the ink droplets by causing a change of state of ink by using thermal energy.

16. An image recording apparatus operable in a facsimile mode to receive data transmitted from a sending station via a line and a printer mode to record data sent from an external host computer apparatus, comprising:

setting means for setting one of said facsimile mode and said printer mode;

storage means for storing the transmitted data from the sending station in said facsimile mode and storing the data from the external host computer apparatus in said printer mode;

record means for recording an image on a recording medium in accordance with the data stored in said storage means; and control means for controlling the setting of said printer mode by said setting means in accordance with whether or not unrecorded data transmitted from the sending station is stored in said storage means, wherein, in said facsimile mode, said control means inhibits the setting of said printer mode when there is unrecorded data stored in said storage means and permits the setting of said printer mode when there is no unrecorded data that was transmitted from the sending station stored in said storage means, and wherein in said printer mode said control means permits the setting of said facsimile mode.

17. An image recording apparatus according to claim 16, wherein said setting means includes manually operable switching means and one of said facsimile mode and said printer mode is set by the switching of said switching means.

18. An image recording apparatus according to claim 16, wherein said setting means monitors the input of a first start signal for starting the operation in said facsimile mode, and sets said facsimile mode when said first start signal is applied.

19. An image recording apparatus according to claim 16, wherein said setting means monitors the input of a second start signal for starting the operation in said printer mode, and sets said printer mode when said second start signal is applied.

20. An image recording apparatus according to claim 16, further comprising initialization means for initializing said facsimile mode when a power is turned on.

21. An image recording apparatus according to any one of claims 17 to 20, wherein said record means includes a recording head for discharging ink droplets in accordance with data and drive means for driving a recording medium relative to said recording head.

22. An image recording apparatus according to claim 21, wherein said recording head discharges the ink droplets by causing a change of state of ink by using thermal energy.

23. In an image recording apparatus operable in a facsimile mode to receive data transmitted from a sending station via a line and a printer mode to record data sent from an external host computer apparatus, a mode switching method comprising:

a first step of inputting a switching request from the facsimile mode to the printer mode;

a second step of determining if unrecorded data transmitted from the sending station is stored in storage means when the switching request is inputted in said first step, the storage means storing the data transmitted from the sending station in the facsimile mode and storing the data from the external host computer apparatus in the printer mode; and a third step of controlling the switching to the printer mode in accordance with the decision in said second step, wherein in the facsimile mode said third step inhibits the switching to the printer mode when said second step determines that the unrecorded data is stored in the storage means and permits the switching to the printer mode when there is no unrecorded data that was transmitted from the sending station stored in the storage means, and wherein in the printer mode the switching to the facsimile mode is permitted.

24. A mode switching method according to claim 23, wherein said first step inputs the switching request from the facsimile mode to the printer mode by manually operable switching means.

25. A mode switching method according to claim 23, wherein said first step inputs the switching request from the facsimile mode to printer mode by a start signal for starting an operation in the printer mode.

26. A mode switching method according to claim 23, further comprising a step, prior to said first step, of setting the facsimile mode upon power-on.

27. A mode switching method according to claim 23, further comprising a step of switching the mode to a facsimile mode upon completion of the recording operation in the printer mode.

28. A mode switching method according to any one of claims 24 to 27, wherein the image recording apparatus records an image by using a recording head for discharging ink droplets in accordance with data.

29. A mode switching method according to claim 28, wherein the recording head discharges the ink droplets by causing a change of state of ink by using thermal energy.

30. An image recording apparatus operable in a facsimile mode to communicate data with a partner station via a line and in a printer mode to record data sent from an external host computer apparatus, comprising:

setting means for setting one of said facsimile mode and said printer mode;

storage means for storing data communicated with the partner station in said facsimile mode and storing the data from the external host computer apparatus in said printer mode;

record means for recording an image on a recording medium in accordance with the data stored in said storage means;

discriminating means for discriminating a storage state of data relating to said facsimile mode in said storage means; and control means for controlling the setting of said printer mode by said setting means in accordance with a discrimination result of said discriminating means, such that said control means inhibits the setting of said printer mode when said discriminating means discriminates that there is unrecorded data relating to said facsimile mode stored in said storage means and permits the setting of said printer mode when said discriminating means discriminates that there is no unrecorded data relating to said facsimile mode stored in said storage means.

31. An image recording apparatus according to claim 30, further comprising switching means for automatically switching to said facsimile mode after the completion of the recording in said printer mode.

32. An image recording apparatus according to claim 30, wherein said setting means includes manually operable switching means and one of said facsimile mode and said printer mode is set by the switching of said switching means.

33. An image recording apparatus according to claim 30, wherein said setting means monitors the input of a first start signal for starting the operation in said facsimile mode, and sets said facsimile mode when said first start signal is applied.

34. An image recording apparatus according to claim 30, wherein said setting means monitors the input of a second start signal for starting the operation in said printer mode, and sets said printer mode when said second start signal is applied.

35. An image recording apparatus according to claim 30, further comprising initialization means for initializing said facsimile mode when a power is turned on.

36. An image recording apparatus according to any one of claims 30 to 35, wherein said record means includes a recording head for discharging ink droplets in accordance with data and drive means for driving a recording medium relative to said recording head.

37. An image recording apparatus according to claim 36, wherein said recording head discharges the ink droplets by causing a change of state of ink by using thermal energy.

38. In an image recording apparatus operable in a facsimile mode to communicate data with a partner station via a line and in a printer mode to record data sent from an external host computer apparatus, a mode switching method comprising:

a first step of inputting a switching request from the facsimile mode to the printer mode;

a second step of discriminating a storage state of data relating to the facsimile mode in storage means, the storage means storing the data communicated with the partner station in the facsimile mode and storing the data from the external host computer apparatus in the printer mode; and a third step of controlling the switching to the printer mode in accordance with the discrimination request in said second step such that said third step inhibits the switching to the printer mode when said second step determines that there is unrecorded data relating to the facsimile mode stored in the storage means and permits the switching to the printer mode when there is no unrecorded data relating to the facsimile mode stored in the storage means.

39. A mode switching method according to claim 38, wherein said first step inputs the switching request from the facsimile mode to the printer mode by manually operable switching means.

40. A mode switching method according to claim 38, wherein said first step inputs the switching request from the facsimile mode to the printer mode by a start signal for starting an operation in the printer mode.

41. A mode switching method according to claim 38, further comprising a step, prior to said first step, of setting the facsimile mode upon power-on.

42. A mode switching method according to claim 38, further comprising a step of switching the mode to the facsimile mode upon completion of the recording operation in the printer mode.

43. A mode switching method according to any one of claims 38 to 42, wherein the image recording apparatus records an image on a recording medium by using a recording head for discharging ink droplets in accordance with data.

44. A mode switching method according to claim 43, wherein the recording head discharges the ink droplets by causing a change of state of ink by using thermal energy.

* * * * *

UNITED STATES PATENT AND TRADEMARK OFFICE
CERTIFICATE OF CORRECTION

PATENT NO.     : 6,519,057 B1
DATED          : February 11, 2003
INVENTOR(S)    : Yuji Kurosawa et al.

It is certified that error appears in the above-identified patent and that said Letters Patent is hereby corrected as shown below:

Column 4,
Line 21, "the-facsimile" should read -- the facsimile --.
Line 24, "printing" should read -- printing, --.

Column 8,
Line 8, "modes" should read -- mode, --.

Signed and Sealed this

Twelfth Day of August, 2003

JAMES E. ROGAN
*Director of the United States Patent and Trademark Office*